(12) United States Patent
Shih et al.

(10) Patent No.: US 10,138,338 B2
(45) Date of Patent: *Nov. 27, 2018

(54) COPOLYESTERS PLASTICIZED WITH POLYMERIC PLASTICIZER

(71) Applicant: Eastman Chemical Company, Kingsport, TN (US)

(72) Inventors: Wayne Ken Shih, Kingsport, TN (US); Kimberley Carmenia Carico, Kingsport, TN (US); Nancy Ellen Kinkade, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/381,995

(22) Filed: Dec. 16, 2016

(65) Prior Publication Data

US 2017/0096536 A1  Apr. 6, 2017

Related U.S. Application Data

(63) Continuation of application No. 13/712,080, filed on Dec. 12, 2012.

(51) Int. Cl.
   *C08J 5/18*      (2006.01)
   *C08K 5/11*      (2006.01)
   *C08K 5/10*      (2006.01)

(52) U.S. Cl.
   CPC ......... *C08J 5/18* (2013.01); *C08K 5/10* (2013.01); *C08K 5/11* (2013.01); *B32B 2307/514* (2013.01); *B32B 2307/518* (2013.01); *C08J 2367/02* (2013.01); *C08J 2467/02* (2013.01)

(58) Field of Classification Search
   None
   See application file for complete search history.

(56) References Cited

U.S. PATENT DOCUMENTS

| | | |
|---|---|---|
| 3,426,754 A | 2/1969 | Bierenbaum et al. |
| 3,562,200 A | 2/1971 | Jones et al. |
| 3,579,608 A | 5/1971 | De Coste |
| 3,579,609 A | 5/1971 | Sevenich |
| 3,585,255 A | 6/1971 | Sevenich |
| 3,849,530 A | 11/1974 | Wyeth et al. |
| 3,901,851 A | 8/1975 | Kohno et al. |
| 3,944,699 A | 3/1976 | Mathews et al. |
| 3,958,064 A | 5/1976 | Brekken et al. |
| 4,020,141 A | 4/1977 | Quinn et al. |
| 4,042,569 A | 8/1977 | Bell et al. |
| 4,138,459 A | 2/1979 | Brazinsky et al. |
| 4,185,047 A | 1/1980 | Cohen |
| 4,318,950 A | 3/1982 | Takashi et al. |
| 4,578,437 A | 3/1986 | Light et al. |
| 4,582,752 A | 4/1986 | Duncan |
| 4,632,869 A | 12/1986 | Park et al. |
| 4,770,931 A | 9/1988 | Pollock et al. |
| 4,771,108 A | 9/1988 | Mackenzie |
| 4,814,426 A | 3/1989 | Utsumi et al. |
| 4,871,784 A | 10/1989 | Otonari et al. |
| 4,939,232 A | 7/1990 | Fukuda et al. |
| 4,942,005 A | 7/1990 | Pollock et al. |
| 4,963,418 A | 10/1990 | Isaka et al. |
| 4,965,123 A | 10/1990 | Swan et al. |
| 4,983,653 A | 1/1991 | Fukuda et al. |
| 4,985,538 A | 1/1991 | Fukuda et al. |
| 4,990,401 A | 2/1991 | Renalls |
| 4,994,214 A | 2/1991 | Stevens et al. |
| 4,996,291 A | 2/1991 | Yoshinaka et al. |
| 5,009,827 A | 4/1991 | Abu-Isa et al. |
| 5,041,476 A * | 8/1991 | Wilder .............. C08L 67/02 524/494 |
| 5,070,180 A | 12/1991 | Fukuda et al. |
| 5,084,334 A | 1/1992 | Hamana et al. |
| 5,087,526 A | 2/1992 | Tomitaka et al. |
| 5,091,236 A | 2/1992 | Keller et al. |
| 5,156,905 A | 10/1992 | Bagrodia et al. |
| 5,176,954 A | 1/1993 | Keller et al. |
| 5,219,941 A | 6/1993 | Meyer, Jr. et al. |
| 5,268,135 A | 12/1993 | Sasaki et al. |
| 5,275,854 A | 1/1994 | Maier et al. |
| 5,290,631 A | 3/1994 | Fleury et al. |
| 5,340,624 A * | 8/1994 | Sublett ............. B29C 55/005 428/35.8 |

(Continued)

FOREIGN PATENT DOCUMENTS

| | | |
|---|---|---|
| CA | 894854 A | 3/1972 |
| CN | 101502997 A | 8/2009 |

(Continued)

OTHER PUBLICATIONS

"Adhesives for Low Energy Surfaces"; Nov. 11, 2002, 3 pages. http://www.specialchem4adhesives.com/home/editorial.aspx?is-149&ttr=lowsurfacetension.

(Continued)

*Primary Examiner* — Z. Jim Yang
(74) *Attorney, Agent, or Firm* — Tammye Taylor

(57) ABSTRACT

Disclosed is a film containing a copolyester having a minimum crystallization half-time of at least 8.6 minutes and a polyester plasticizer having a weight-average molecular weight of 900 to 12,000 g/mol. The polyester plasticizer includes (i) a polyol component comprising residues of a polyol having 2 to 8 carbon atoms, and (ii) a diacid component comprising residues of a dicarboxylic acid having 4 to 12 carbon atoms.

20 Claims, No Drawings

(56) References Cited

U.S. PATENT DOCUMENTS

| | | | |
|---|---|---|---|
| 5,354,595 A | 10/1994 | Yamamoto et al. | |
| 5,403,897 A * | 4/1995 | Ebato | C08G 63/60 428/480 |
| 5,422,175 A | 6/1995 | Ito et al. | |
| 5,435,955 A | 7/1995 | Kamei et al. | |
| 5,534,570 A | 7/1996 | Shih et al. | |
| 5,554,120 A | 9/1996 | Chen et al. | |
| 5,589,126 A | 12/1996 | Shih et al. | |
| 5,605,981 A * | 2/1997 | Imamura | C08G 63/60 524/779 |
| 5,683,815 A * | 11/1997 | Leiss | B32B 27/06 428/424.4 |
| 5,750,617 A * | 5/1998 | Eck | C08F 18/04 524/718 |
| 5,786,442 A * | 7/1998 | Harmsen | C08G 63/20 264/239 |
| 5,800,758 A | 9/1998 | Topolkaraev et al. | |
| 5,811,493 A | 9/1998 | Kent | |
| 5,824,398 A | 10/1998 | Shih | |
| 5,843,578 A | 12/1998 | Sasaki et al. | |
| 5,858,507 A | 1/1999 | Yoshida et al. | |
| 5,859,116 A | 1/1999 | Shih | |
| 5,888,650 A | 3/1999 | Calhoun et al. | |
| 5,932,150 A | 8/1999 | Lacey | |
| 5,932,685 A | 8/1999 | Mori et al. | |
| 5,985,387 A | 11/1999 | Mori et al. | |
| 6,004,664 A | 12/1999 | Sasaki et al. | |
| 6,054,209 A | 4/2000 | Imanishi et al. | |
| 6,068,910 A | 5/2000 | Flynn et al. | |
| 6,117,928 A | 9/2000 | Hiltunen et al. | |
| 6,177,181 B1 | 1/2001 | Hamada et al. | |
| 6,228,313 B1 | 5/2001 | Miki | |
| 6,231,958 B1 | 5/2001 | Kim et al. | |
| 6,261,663 B1 | 7/2001 | Peiffer et al. | |
| 6,268,052 B1 | 7/2001 | Kurz et al. | |
| 6,287,680 B1 | 9/2001 | Sasaki et al. | |
| 6,348,258 B1 | 2/2002 | Topolkaraev et al. | |
| 6,362,306 B1 | 3/2002 | Shelby et al. | |
| 6,383,627 B2 | 5/2002 | Hashimoto et al. | |
| 6,451,445 B1 | 9/2002 | Ito et al. | |
| 6,458,437 B1 | 10/2002 | Ito et al. | |
| 6,465,063 B1 | 10/2002 | Hayakawa et al. | |
| 6,500,533 B1 | 12/2002 | Kong et al. | |
| 6,528,133 B1 | 3/2003 | Kim et al. | |
| 6,544,607 B1 | 4/2003 | Kuroki et al. | |
| 6,548,595 B2 | 4/2003 | Ito et al. | |
| 6,589,463 B1 | 7/2003 | Vogt et al. | |
| 6,599,994 B2 | 7/2003 | Shelby et al. | |
| 6,616,998 B2 | 9/2003 | Greer et al. | |
| 6,627,695 B2 | 9/2003 | Murschall et al. | |
| 6,635,340 B2 | 10/2003 | Peiffer et al. | |
| 6,663,628 B2 | 12/2003 | Hideki et al. | |
| 6,663,977 B2 * | 12/2003 | Kurian | B29C 47/0026 428/35.7 |
| 6,720,085 B2 | 4/2004 | Ito et al. | |
| 6,761,966 B2 | 7/2004 | Ito et al. | |
| 6,765,070 B2 | 7/2004 | Tamura et al. | |
| 6,863,939 B2 | 3/2005 | Laney et al. | |
| 6,867,168 B2 | 3/2005 | Laney et al. | |
| 6,893,706 B2 | 5/2005 | Peiffer et al. | |
| 6,939,616 B2 | 9/2005 | Hayakawa et al. | |
| 6,958,178 B2 | 10/2005 | Hayakawa et al. | |
| 6,984,443 B2 | 1/2006 | Kuroki et al. | |
| 7,001,651 B2 | 2/2006 | Hayakawa et al. | |
| 7,030,181 B2 | 4/2006 | Moskala et al. | |
| 7,074,467 B2 | 7/2006 | Kim et al. | |
| 7,128,863 B2 | 10/2006 | Kim et al. | |
| 7,135,224 B2 | 11/2006 | Sumi et al. | |
| 7,147,927 B2 | 12/2006 | Pecorini et al. | |
| 7,166,342 B2 | 1/2007 | Hayakawa et al. | |
| 7,273,894 B2 | 9/2007 | Shelby et al. | |
| 7,285,587 B2 | 10/2007 | Strand et al. | |
| 7,303,812 B2 | 12/2007 | Hashimoto et al. | |
| 7,306,835 B2 | 12/2007 | Hong et al. | |
| RE40,274 E | 4/2008 | Ito et al. | |
| 7,749,584 B2 | 7/2010 | Hayakawa et al. | |
| 7,900,054 B2 | 3/2011 | Peiffer et al. | |
| 8,986,591 B2 | 3/2015 | Shelby et al. | |
| 2001/0014729 A1 | 8/2001 | Hayakawa et al. | |
| 2001/0036545 A1 | 11/2001 | Nishi et al. | |
| 2003/0050430 A1 | 3/2003 | Ito et al. | |
| 2003/0060546 A1* | 3/2003 | Moskala | B29C 67/24 524/284 |
| 2003/0065075 A1* | 4/2003 | Flynn | C08J 5/18 524/394 |
| 2003/0068453 A1 | 4/2003 | Kong | |
| 2003/0088033 A1 | 5/2003 | Shelby et al. | |
| 2003/0104193 A1 | 6/2003 | Martin et al. | |
| 2003/0116880 A1* | 6/2003 | Mueller | B32B 27/36 264/173.13 |
| 2003/0165671 A1 | 9/2003 | Hashimoto et al. | |
| 2003/0170427 A1 | 9/2003 | Ito et al. | |
| 2003/0180560 A1 | 9/2003 | Peiffer et al. | |
| 2004/0068059 A1* | 4/2004 | Katayama | C08G 18/4277 525/466 |
| 2004/0121910 A1 | 6/2004 | Laney et al. | |
| 2004/0127609 A1* | 7/2004 | Strand | C08K 5/10 524/115 |
| 2004/0180229 A1 | 9/2004 | Hayakawa et al. | |
| 2004/0185198 A1 | 9/2004 | Sisson et al. | |
| 2004/0232563 A1 | 11/2004 | Sumi et al. | |
| 2004/0242803 A1* | 12/2004 | Ohme | C08L 59/00 525/400 |
| 2005/0118406 A1 | 6/2005 | Shelby et al. | |
| 2005/0119359 A1 | 6/2005 | Shelby et al. | |
| 2005/0142313 A1 | 6/2005 | Grah | |
| 2006/0111519 A1* | 5/2006 | Strand | C08L 67/02 525/444 |
| 2006/0121219 A1 | 6/2006 | Shelby et al. | |
| 2007/0004813 A1 | 1/2007 | Shelby et al. | |
| 2007/0009750 A1* | 1/2007 | Ito | B65D 65/02 428/458 |
| 2007/0065649 A1 | 3/2007 | Matsui et al. | |
| 2007/0104931 A1 | 5/2007 | Ito et al. | |
| 2007/0116909 A1* | 5/2007 | Tweed | B29C 47/0021 428/34.9 |
| 2009/0032995 A1 | 2/2009 | Mukunoki et al. | |
| 2009/0227735 A1 | 9/2009 | Shih et al. | |
| 2009/0253871 A1* | 10/2009 | Flynn | C08G 63/52 525/418 |
| 2009/0316085 A1 | 12/2009 | Zhang et al. | |
| 2010/0112251 A1 | 5/2010 | Shelby et al. | |
| 2010/0143623 A1* | 6/2010 | Hiruma | C08J 5/18 428/35.1 |
| 2010/0159176 A1 | 6/2010 | Hale | |
| 2010/0224529 A1* | 9/2010 | Forloni | B29C 55/023 206/524.1 |
| 2010/0295200 A1 | 11/2010 | Shelby et al. | |
| 2010/0331513 A1 | 12/2010 | Kim | |
| 2011/0028629 A1 | 2/2011 | Yamamura | |
| 2011/0091705 A1 | 4/2011 | Shih et al. | |

FOREIGN PATENT DOCUMENTS

| | | |
|---|---|---|
| EP | 0044616 A1 | 1/1982 |
| EP | 0194 058 A2 | 12/1986 |
| EP | 0203739 A1 | 12/1986 |
| EP | 0214859 A2 | 3/1987 |
| EP | 0522758 A | 1/1993 |
| EP | 0581970 B1 | 8/1998 |
| EP | 1024162 A1 | 8/2000 |
| EP | 1090739 A2 | 4/2001 |
| EP | 1298171 A1 | 4/2003 |
| EP | 1304219 A1 | 4/2003 |
| EP | 1340609 A2 | 9/2003 |
| EP | 1340785 A2 | 9/2003 |
| EP | 1359184 A1 | 11/2003 |
| EP | 1391288 A1 | 2/2004 |
| EP | 1418042 A1 | 5/2004 |
| EP | 1431055 A2 | 6/2004 |
| EP | 1491576 A1 | 12/2004 |
| EP | 1661936 A1 | 5/2006 |

(56) References Cited

FOREIGN PATENT DOCUMENTS

| | | |
|---|---|---|
| GB | 2393418 A | 3/2004 |
| JP | 5327307 B | 8/1978 |
| JP | 57159618 A | 10/1982 |
| JP | 61037827 A | 2/1986 |
| JP | 63193822 A | 8/1988 |
| JP | 3178421 A | 8/1991 |
| JP | 4117432 A | 4/1992 |
| JP | 4153233 A | 5/1992 |
| JP | 5104630 A | 4/1993 |
| JP | 5194773 A | 8/1993 |
| JP | 5279494 A | 8/1993 |
| JP | 5245930 A | 9/1993 |
| JP | 5345398 A | 12/1993 |
| JP | 6166133 A | 6/1994 |
| JP | 6271747 A | 9/1994 |
| JP | 07053756 A | 2/1995 |
| JP | 9095605 A | 4/1997 |
| JP | H1036651 A | 2/1998 |
| JP | 11-12377 A | 1/1999 |
| JP | 11-263854 A | 9/1999 |
| JP | 200017093 A | 1/2000 |
| JP | 2000290356 A | 10/2000 |
| JP | 3139533 B2 | 12/2000 |
| JP | 200171441 A | 3/2001 |
| JP | 2001219519 A | 8/2001 |
| JP | 2001301023 A | 10/2001 |
| JP | 200260531 A | 2/2002 |
| JP | 2002036356 A | 2/2002 |
| JP | 2002278460 A | 9/2002 |
| JP | 2002332394 A | 11/2002 |
| JP | 2003154619 A | 5/2003 |
| JP | 2003159773 A | 6/2003 |
| JP | 2003-267437 A | 9/2003 |
| JP | 2003266537 A | 9/2003 |
| JP | 2003292592 A | 10/2003 |
| JP | 2003340922 A | 12/2003 |
| JP | 2004051888 A | 2/2004 |
| JP | 2004123784 A | 4/2004 |
| JP | 2004-209905 A | 7/2004 |
| JP | 2004181863 A | 7/2004 |
| JP | 3644153 B2 | 4/2005 |
| JP | 2007083734 A | 4/2007 |
| JP | 2007169323 A | 7/2007 |
| JP | 2007169546 A | 7/2007 |
| JP | 2007196679 A | 8/2007 |
| JP | 2009178887 A | 8/2009 |
| WO | WO 95/14734 A1 | 6/1995 |
| WO | WO 9962982 | 12/1999 |
| WO | WO 00/69962 A1 | 11/2000 |
| WO | WO 0106575 A1 | 1/2001 |
| WO | WO 0112697 | 2/2001 |
| WO | WO 0158684 A1 | 8/2001 |
| WO | WO 03/008499 A1 | 1/2003 |
| WO | WO 03/013833 A | 2/2003 |
| WO | WO 03/029002 A1 | 4/2003 |
| WO | WO 2004076525 A1 | 9/2004 |
| WO | WO 2005061596 A1 | 7/2005 |
| WO | WO 2005061628 A1 | 7/2005 |
| WO | WO 2006062075 A1 | 6/2006 |
| WO | WO 2010056271 A1 | 5/2010 |

OTHER PUBLICATIONS

ASTM International Designation: D882-12, "Standard Test Method for Tensile Properties of Thin Plastic Sheeting" Sep. 2012.
ASTM International Designation: D3850-12, "Standard Test Method for Rapid Thermal Degradation of Solid Electrical Insulating Materials by Thermogravimetric Method (TGA)" Feb. 2012.
"CHDM-Modified PET Copolyester: Preparation and Properties"; Modern Polymers: Chemistry and Technology of Polyesters and Copolyesters; 2003; pp. 280-281.
Database WPI Week 198245, Thomson Scientific, London, GB; AN 1982-96228E XP002529829—JP 57 159618 abstract.
Database WPI Week 199343, Thomson Scientific, London, GB; AN 1993-339351 XP002529830—JP 05 245930 abstract.
Database WPI Week 199517, Thomson Scientific, London, GB; AN 1995-128474 XP002529828—JP 07 053756 abstract.
Database WPI Week 199816, Thomson Scientific, London, GB; AN 1998-175120 XP002720661—JP H10 36651 abstract.
Derwent Abstract 1993-002710.
Derwent Abstract 2002-123291.
Derwent Abstract 2002-207165.
Derwent Abstract 2002-330958.
Derwent Abstract 2002-330959.
Dixon, E. R., et al.; The Inter-Relation of Some Mechanical Properties with Molecular Weight and Crystallinity in Poly(ethylene terephthalate); Journal of Materials Science 3, (1968), pp. 464-470.
"Glass Transition Temperature"; May 7, 2007, 6 pages. http://www.answers.com/topic/glass-transition-temperature.
Iwakura, Yoshio et al.; "Oligoesters: I. The Dichloroacetyl Group as a New Hydroxyl Protecting Group for Oligoester Synthesis"; Die Makromolekular Chemie, 108; 1967; pp. 300-303.
Shih, Wayne K.; "Shrinkage Modeling of Polyester Shrink Film"; Polymer Engineering and Science, Jul. 1994, vol. 34, No. 14, pp. 1121-1128.
Wu, Souheng; "Surface and interfacial Tensions of Polymers, Oligomers, Plasticizers, and Organic Pigments"; Polymer Handbook, Edited by Brandrup et al, John Wiley & Sons, (1989), pp. 411-434.
Young, W. C.; Roarl's Formulas for Stress and Strain, $6^{th}$ Edition, McGrawHill, New York, p. 689 (1989).
Notification of Transmittal of the International Search Report and the Written Opinion of the International Searching Authority, or the Declaration dated Jun. 26, 2009 received in International Patent Application No. PCT/US2009/001441.
Notification of Transmittal of the International Search Report and the Written Opinion of the International Searching Authority, or the Declaration dated Mar. 4, 2014 received in International Patent Application No. PCT/US2013/072551.
Notification of Transmittal of the International Search Report and the Written Opinion of the International Searching Authority, or the Declaration dated May 19, 2006 received in International Patent Application No. PCT/US2005/042469.

* cited by examiner

COPOLYESTERS PLASTICIZED WITH POLYMERIC PLASTICIZER

CROSS-REFERENCE TO RELATED APPLICATIONS

This application is a continuation of U.S. patent application Ser. No. 13/712,080, filed on Dec. 12, 2012, the disclosure of which is incorporated herein by reference in its entirety.

FIELD OF THE INVENTION

The invention generally relates to copolyester-based films with polymeric plasticizers.

BACKGROUND OF THE INVENTION

A plasticizer is a polymer additive that serves to increase the polymer's flexibility, elongation, or ease of processing. It is typically added during the compounding process of the polymer and interacts with the polymer only physically. The most commonly measured physical effects of a plasticizer include melt viscosity, elastic modulus, and glass transition.

One common class of plasticizers is based on phthalates. Phthalate plasticizers, such as dioctyl phthalate (DOP) and di-2-ethylhexyl phthalate (DEHP), are widely used in polyvinyl chloride (PVC) products for medical delivery systems, children's toys, baby devices, and shrink film.

Shrink film or heat-shrink film is a polymer film that shrinks in one or more directions when heat is applied. To give the polymer film its shrinkability, the film is stretched when it is above Tg of the polymer to orient the molecules from their initial random pattern. Cooling the film sets its characteristics until it is reheated. Reheating causes the film to shrink back towards its initial dimensions.

Unlike PVC shrink film, phthalate plasticizers do not work in polyester shrink film mainly due to compatibility and stability issues. Certain copolyesters, without any plasticizer, can be converted into shrink film, but they suffer from two main disadvantages. One disadvantage is that a copolyester film without a plasticizer has a high shrink on-set temperature. Because of the high shrink on-set temperature, the film will not finish shrinking completely in a steam tunnel, especially on a high-speed line in which the dwell time in the tunnel is short. The other disadvantage is that such a film has a high shrink force. If used as a container label, the high shrink force can cause wrinkles in the film as well as distort the container's shape. Two US patents have addressed these disadvantages.

U.S. Pat. No. 5,589,126 claims a polyester shrink film with 1 to 10 weight percent of a plasticizer selected from a $C_4$ to $C_{20}$ alkyl ester of an epoxidized fatty acid having 12 to 20 carbon atoms. In one embodiment, the plasticizer is selected from the group consisting of octyl epoxy soyate, epoxy tallates, epoxidized soybean oil, epoxidized linseed oil, triphenyl phosphate, neopentyl glycol dibenzoate, glycerine, vegetable oil, and mineral oil.

U.S. Pat. No. 5,824,398 claims a polyester shrink film containing 1 to 10 weight percent of a plasticizer selected from a $C_5$ to $C_{35}$ monoglyceride prepared from the reaction of glycerol and a fatty acid having 4 to 30 carbon atoms.

These two patents address the plasticizer compatibility issue, but do not entirely solve the stability issue. In other words, the plasticizer tends to separate from the polymer matrix and migrate to the surface of a film, especially at higher processing temperatures. This is also a prevailing problem for plasticized PVC.

Another patent (U.S. Pat. No. 6,362,306) discloses a polyester designed to have optimal shrink on-set temperature and ultimate shrinkage to satisfy full-body labeling and steam tunnel operation. Generally, polymers having a high diethylene glycol (DEG) content, may result in a more brittle film which may limit high-speed tentering and down-gauging.

In view of the above, there is a need in the art for polyester-based shrink films that do not suffer from compatibility and stability issues with plasticizers and that do not require high DEG content.

The present invention aims to address this need as well as others, which will become apparent from the following description and the appended claims.

SUMMARY OF THE INVENTION

The invention is as set forth in the appended claims.

Briefly, in one aspect, the present invention provides a shrink film. Another aspect, the present invention provides a stretched film with polymeric plasticizers. The shrink film comprises (a) a copolyester having a minimum crystallization half-time ($t_{1/2}$ min) of at least 8.6 minutes, and (b) a polyester plasticizer having a weight-average molecular weight ($M_w$) of 900 to 12,000 g/mol. The polyester plasticizer comprises (i) a polyol component comprising residues of a polyol having 2 to 8 carbon atoms, and (ii) a diacid component comprising residues of a dicarboxylic acid having 4 to 12 carbon atoms.

In another aspect, the present invention provides a method of making a shrink film. The method comprises (I) preparing a mixture comprising: (a) a copolyester having a minimum crystallization half-time ($t_{1/2}$ min) of at least 8.6 minutes; and (b) a polyester plasticizer having a weight-average molecular weight ($M_w$) of 900 to 12,000 g/mol; (II) forming a film from the mixture; and (III) stretching the film to form a shrink film. The polyester plasticizer comprises (i) a polyol component comprising residues of a polyol having 2 to 8 carbon atoms, and (ii) a diacid component comprising residues of a dicarboxylic acid having 4 to 12 carbon atoms.

In another aspect, the present invention provides a stretched film comprising: (a) an amorphous copolyester having a minimum crystallization half-time ($t_{1/2}$ min) of at least 8.6 minutes, wherein the copolyester comprises: (i) a diacid component comprising at least 50 mole percent of residues of terephthalic acid, naphthalenedicarboxylic acid, 1,4-cyclohexanedicarboxylic acid, isophthalic acid, or mixtures thereof; and (ii) a diol component comprising at least 80 mole percent of residues of a diol containing 2 to 10 carbon atoms, wherein the diacid component is based on 100 mole percent of total diacid residues in the copolyester and the diol component is based on 100 mole percent of total diol residues in the copolyester; and (b) a polyester plasticizer having a weight-average molecular weight ($M_w$) of 900 to 12,000 g/mol, wherein the polyester plasticizer comprises: (i) a diol component comprising residues of a diol having 2 to 8 carbon atoms; and (ii) a diacid component comprising residues of a dicarboxylic acid having 4 to 12 carbon atoms; wherein the film has a glass transition temperature of from 40 to 150° C. and the film is stretched at temperatures 5° C. to 80° C. above its glass transition temperature ($T_g$); wherein the stretched film has a thickness of 25 to 75 micrometers;

wherein the film is stretched from 2 to 6 times its original measurements; and wherein the film is clear.

DETAILED DESCRIPTION OF THE INVENTION

It has been surprisingly discovered that polyester shrink films with the desired shrinkage characteristics can be obtained using a polymeric polyester plasticizer. The polyester plasticizer is capable of providing both compatibility and high temperature stability with copolyester-based materials. The polyester plasticizer can lower the glass transition and thus reduce the shrink on-set temperature of the resulting film. The film's shrink force can also be improved by adjusting the amount of the plasticizer. The plasticized film remains clear, which makes it ideal for use in shrink film applications. Unlike polyester shrink films containing high DEG content, the plasticized film of the invention is much stronger and can be produced, down-gauged, converted, and applied at a much higher speed without film breakage.

The shrink film according to the invention comprises (a) a copolyester having a minimum crystallization half-time ($t_{1/2}$ min) of at least 8.6 minutes, and (b) a polyester plasticizer having a weight-average molecular weight ($M_w$) of 900 to 12,000 g/mol.

Any copolyester can be used in this invention provided that its minimum crystallization half-time is at least 8.6 minutes. Crystallization half-times can be measured using a differential scanning calorimeter according to the following procedure. A sample of 10.0 mg of the copolyester is sealed in an aluminum pan and heated at a rate of 320° C./min to 290° C. and held for 2 minutes in a helium atmosphere. The sample is then cooled immediately at a rate of 320° C./min to an isothermal crystallization temperature ranging from 140° C. to 200° C. with a 10° C. interval. The crystallization half-time at each temperature is then determined as the time needed to reach the peak on the exothermic curve. The minimum crystallization half-time is the temperature at which the crystallization rate is the fastest.

Unless the context clearly suggests otherwise, the terms "polyester" and "copolyester" are used interchangeably herein. The term "polyester" is intended to include "copolyesters" and is understood to mean a synthetic polymer prepared by the polycondensation of one or more difunctional carboxylic acids (or diacids) with one or more difunctional hydroxyl compounds (or diols). Typically, the difunctional carboxylic acid is a dicarboxylic acid and the difunctional hydroxyl compound is a dihydric alcohol such as, for example, glycols and diols.

The term "residue" means any organic structure incorporated into a polymer through a polycondensation reaction involving the corresponding monomer. The term "repeating unit" means an organic structure having a dicarboxylic acid residue (or diacid component) and a diol residue (or diol component) bonded through a carbonyloxy group. Thus, the dicarboxylic acid residues may be derived from a dicarboxylic acid monomer or its associated acid halides, esters, salts, anhydrides, or mixtures thereof. The term "base film" means an extruded, unstretched film.

The copolyester may be semi-crystalline or amorphous, preferably amorphous. The copolyester contains repeat units from a dicarboxylic acid and a diol, based on 100 mole percent of dicarboxylic acid residues and 100 mole percent of diol residues, respectively.

The diacid component preferably contains at least 50 mole percent of the residues of an aromatic dicarboxylic acid having 8 to 14 carbon atoms. The copolyester may optionally be modified with up to 50 mole percent, based on 100 mole percent of dicarboxylic acid residues, of the residues of one or more different dicarboxylic acids other than an aromatic dicarboxylic acid, such as saturated aliphatic dicarboxylic acids having 4 to 12 carbon atoms and cycloaliphatic dicarboxylic acids having 8 to 12 carbon atoms. Specific examples of dicarboxylic acids include terephthalic acid, phthalic acid, isophthalic acid, naphthalene dicarboxylic acid, 1,4-cyclohexane dicarboxylic acid, cyclohexane diacetic acid, diphenyl-4,4'-dicarboxylic acid, succinic acid, glutaric acid, adipic acid, azelaic acid, sebacic acid, and the like. The polyester may be prepared from one or more of the above dicarboxylic acids.

It should be understood that use of the corresponding acid anhydrides, esters, and acid chlorides of these acids is included in the term "dicarboxylic acid."

The diol component preferably contains at least 80 mole percent of the residues of a diol containing 2 to 10 carbon atoms. In addition, the diol component may optionally be modified with up to 20 mole percent, based on 100 mole percent of diol residues, of the residues of one or more other diols. Specific examples of diols include ethylene glycol, diethylene glycol, triethylene glycol, propane-1,3-diol, butane-1,4-diol, 2,2-dimethylpropane-1,3-diol (neopentyl glycol), 2,2,4,4,-tetramethyl-1,3-cyclobutanediol, pentane-1,5-diol, hexane-1,6-diol, 1,4-cyclohexanedimethanol, 3-methyl-pentanediol-(2,4), 2-methylpentanediol-(1,4), 2,2,4-tri-methylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane, and the like. The polyester may be prepared from one or more of the above diols.

The polyester may also contain small amounts of trifunctional or tetrafunctional co-monomers such as trimellitic anhydride, trimethylolpropane, pyromellitic dianhydride, pentaerythritol, and other polyester forming polyacids or polyols generally known in the art.

In one embodiment, the copolyester comprises (i) a diacid component comprising at least 50 mole percent of residues of terephthalic acid, naphthalenedicarboxylic acid, 1,4-cyclohexanedicarboxylic acid, isophthalic acid, or mixtures thereof; and (ii) a diol component comprising at least 80 mole percent of residues of a diol containing 2 to 10 carbon atoms. Preferably, the diacid component of the copolyester comprises at least 80 mole percent of the residues of terephthalic acid, naphthalenedicarboxylic acid, 1,4-cyclohexanedicarboxylic acid, isophthalic acid, or mixtures thereof. And preferably, the diol component of the copolyester comprises the residues of ethylene glycol, 1,4-cyclohexanedimethanol, diethylene glycol, neopentyl glycol, 2,2,4,4-tetramethyl-1,3-cyclobutanediol, or mixtures thereof.

In another embodiment, the copolyester comprises (i) a diacid component comprising at least 80 mole percent of terephthalic acid residues, and (ii) a diol component comprising at least 80 mole percent of the residues of ethylene glycol and 1,4-cyclohexanedimethanol. In yet another embodiment, the copolyester comprises (i) a diacid component comprising at least 80 mole percent of terephthalic acid residues, and (ii) a diol component comprising at least 80 mole percent of the residues of ethylene glycol, 1,4-cyclohexanedimethanol, and diethylene glycol. In yet another embodiment, the copolyester comprises (i) a diacid component comprising at least 80 mole percent of terephthalic acid residues, and (ii) a diol component comprising at least 80 mole percent of residues of ethylene glycol and neopentyl glycol. In yet another embodiment, the copolyester comprises (i) a diacid component comprising at least 80 mole percent of terephthalic acid residues, and (ii) a diol component comprising at least 80 mole percent of the residues of 1,4-cyclohexanedimethanol and 2,2,4,4-tetramethyl-1,3-cycobutanediol.

Copolyesters useful in the present invention can have an inherent viscosity of 0.5 to 1.2 dL/g. Preferably, the copolyester has an inherent viscosity of 0.6 to 0.9 dL/g as measured at 25° C. using 0.50 grams of polymer per 100 mL of a solvent consisting of 60% by weight of phenol and 40% by weight of tetrachloroethane. Copolyesters useful in the present invention can also have a glass transition temperature of 40° C. to 150° C., preferably 50° C. to 100° C., and more preferably from 50° C. to 90° C.

The copolyester may be prepared by conventional polycondensation procedures well-known in the art. Such processes include direct condensation of the dicarboxylic acid(s) with the diol(s) or by ester interchange using a dialkyl dicarboxylate. For example, a dialkyl terephthalate such as dimethyl terephthalate is ester interchanged with the diol(s) at elevated temperatures in the presence of a catalyst. The polyesters may also be subjected to solid-state polymerization methods. Suitable methods include the steps of reacting one or more dicarboxylic acids with one or more glycols at a temperature of about 100° C. to 315° C. at a pressure of about 0.1 to 760 mm Hg for a time sufficient to form a polyester. See U.S. Pat. No. 3,772,405 for methods of producing polyesters, the disclosure of such methods which is incorporated herein by reference.

The copolyesters useful in the present invention may be obtained commercially from Eastman Chemical Company.

The polyester plasticizer for use in the present invention has a weight-average molecular weight ($M_w$) of 900 to 12,000 g/mol. Preferably, the plasticizer has a $M_w$ of 1,000 to 5,000 g/mol.

The plasticizer comprises (i) a polyol component comprising the residues of a polyol having 2 to 8 carbon atoms, and (ii) a diacid component comprising the residues of a dicarboxylic acid having 4 to 12 carbon atoms.

Suitable polyols containing from 2 to 8 carbons atoms include ethylene glycol, 1,2- or 1,3-propanediol; 1,2- or 1,3- or 1,4-butanediol; diethylene glycol; and dipropylene glycol.

Suitable dicarboxylic acids may be represented by the formula HO(O)CRC(O)OH where R is selected from the group consisting of linear and branched alkylene radicals containing from 2 to 10 carbon atoms and phenylene. Specific examples of such dicarboxylic acids include succinic acid, glutaric aid, adipic acid, azelaic acid, sebacic acid, isophthalic acid, orthophthalic acid, terephthalic acid, benzene-1,2-dicarboxylic acid, benzene-1,4-dicarboxylic acid, and mixtures thereof. Anhydrides of these diacids can readily be used depending on cost and availability.

In one embodiment, the polyester plasticizer comprises residues of phthalic acid, adipic acid, or mixtures thereof; and residues of 1,2-propanediol, 1,3-butanediol, 1,4-butanediol, or mixtures thereof.

The plasticizers according to the invention can, in general, be made by reacting one or more diols, glycols, and/or polyols with one or more cyclic or aliphatic organic acids containing two or more acid functionalities until the desired molecular weight is obtained as determined by viscosity measurements or any other generally acceptable method. The molecular weight of the polymer can be controlled by capping the unreacted acid or alcohol functionality at the end of the polyester chains using either mono-functional alcohols or monobasic carboxylic acids until the desired hydroxyl and/or acid number of the product is reached. Typical hydroxyl numbers of the polyester plasticizers can range from 0 to 40 mg KOH/g, and the acid numbers or acid values can range from 0 to 50 mg KOH/g and more typically from 1 to 5 mg KOH/g.

The capping agents can be chosen from any number of readily available alcohols or acids. Suitable capping alcohols can contain 2 to 18 carbon atoms and can be linear or branched. Suitable monobasic acid capping agents include those containing 2 to 22 carbons and can be any number of fatty acids containing $C_8$ to $C_{22}$ carbons or other common acids such as acetic acid or 2-ethyl hexanoic acid. Anhydrides, such as acetic anhydride, can be used in place of the acid.

The plasticizers useful in the present invention are also available commercially under the name Admex™ from Eastman Chemical Company.

The shrink film according to the invention may be prepared by the following method. Before preparing a mixture of the copolyester and the plasticizer, the copolyester, the plasticizer, or both may first optionally be dried in an atmosphere of dried air or dried nitrogen, or under reduced pressure.

Next, the plasticizer can be mixed with the copolyester by any suitable melt blending process such as batch mixing, single screw, or twin-screw extrusion. Preferably, the plasticizer is injected into the melt of the copolyester using a liquid or solid pumping system. The copolyester/plasticizer mixture may also be prepared by adding the plasticizer to the polyester in the polymerization after polymerization is essentially complete. After completing the melt compounding and upon exiting the extruder, the extrudate may be shaped into a film. Alternatively, the extrudate may be withdrawn in strand form and cut into pellets, or may be formed directly into pellets.

The pellets, prepared above, may be used as a concentrate, which is mixed with additional quantities of the copolyester. Methods for mixing the concentrate pellets with the copolyester pellets include feeding the concentrate pellets with an additive feeder and mechanically mixing the copolyester and concentrate pellets. The copolyester/concentrate blends may then be dried, melt blended, and extruded into a film. Preferably, this film (before stretching) is visually clear.

Alternatively, the copolyester/concentrate blends may be formed into a film by calendering as disclosed in, e.g., U.S. Pat. No. 6,068,910. Of course, other conventional methods of film formation may be used as well.

The shape of the film is not restricted in any way. For example, it may be a flat sheet or a tube. Next, the film is stretched, for example, in either the machine direction, the transverse direction, or both from 2 to 6 times the original measurements.

The film may be stretched by any usual method, such as the roll stretching method, the long-gap stretching method, the tenter-stretching method, and the tubular stretching method. With use of any of these methods, it is possible to conduct biaxial stretching in succession, simultaneous biaxial stretching, uni-axial stretching, or a combination of these. With the biaxial stretching mentioned above, stretching in the machine direction and transverse direction may be done at the same time. Also, the stretching may be done first in one direction and then in the other direction to result in effective biaxial stretching. Preferably, stretching of the film is done by preliminarily heating the film 5° C. to 80° C. above its glass transition temperature ($T_g$). More preferably, the film is preliminarily heated to 10° C. to 20° C. above its $T_g$. Preferably, the stretch rate is from 5 to 20 inches (12.7 to 50.8 cm) per second.

Generally, the shrink film according to the invention may contain from 0.01 to 10 weight percent of the polyester plasticizer. Preferably, the shrink film contains from 0.1 to 5 weight percent of the polyester plasticizer. Generally, the shrink film may contain from 90 to 99.99 weight percent of the copolyester. Preferably, the shrink film contains from 95 to 99.9 weight percent of the copolyester.

In a preferred embodiment, the shrink film according to the invention has a shrinkage of 30 to 80% in the transverse direction when submerged in a 95° C. water bath for 10 seconds.

In another preferred embodiment, the shrink film according to the invention has a thickness of 25 to 75 micrometers.

In yet another preferred embodiment, the shrink film according to the invention has a shrink stress in the transverse direction of less than 16 MPa when measured at 400° F.

The shrink film of the invention may further comprise one or more additives in amounts that do not adversely affect the resulting properties of the film. Examples of additives include antioxidants, melt strength enhancers, chain extenders, flame retardants, fillers, acid scavengers, dyes, colorants, pigments, anti-blocking agents, flow enhancers, impact modifiers, antistatic agents, processing aids, mold-release additives, plasticizers, slip agents, stabilizers, waxes, UV absorbers, optical brighteners, lubricants, pinning additives, foaming agents, nucleators, glass beads, metal spheres, ceramic beads, carbon black, cross-linked polystyrene or acrylic beads, and the like. Colorants, sometimes referred to as toners, may be added to impart a desired neutral hue and/or brightness to the polyester blends. Representative examples of fillers include calcium carbonate, talc, clay, mica, zeolites, wollastonite, kaolin, diatomaceous earth, $TiO_2$, $NH_4Cl$, silica, calcium oxide, sodium sulfate, and calcium phosphate. Titanium dioxide and other pigments or dyes, may be included, for example, to control whiteness of films, or to make colored films.

As used herein, the indefinite articles "a" and "an" mean one or more, unless the context clearly suggests otherwise. Similarly, the singular form of nouns includes their plural form, and vice versa, unless the context clearly suggests otherwise.

While attempts have been made to be precise, the numerical values and ranges described herein should be considered to be approximations. These values and ranges may vary from their stated numbers depending upon the desired properties sought to be obtained by the present invention as well as the variations resulting from the standard deviation found in the measuring techniques. Moreover, the ranges described herein are intended and specifically contemplated to include all sub-ranges and values within the stated ranges. For example, a range of 50 to 100 is intended to include all values within the range including sub-ranges such as 60 to 90 and 70 to 80. This invention can be further illustrated by the following examples of preferred embodiments thereof, although it will be understood that these examples are included merely for purposes of illustration and are not intended to limit the scope of the invention. Unless otherwise indicated, all percentages are by weight.

EXAMPLES

Tables 1 and 2 below list the plasticizers and copolyesters, respectively, used in the following examples.

TABLE 1

| Plasticizer Identifier | Plasticizer Type | $M_w$ (g/mol) | Raw Materials | Structure |
|---|---|---|---|---|
| P1 | Polyester | 936 | phthalic acid<br>1,2-propanediol<br>1,4-butanediol | — |
| P2 | Polyester | 2,848 | adipic acid<br>1,2-propanediol<br>1,4-butanediol | — |
| P3 | Polyester | 3,217 | adipic acid<br>1,2-propanediol<br>1,4-butanediol | — |
| P4 | Polyester | 4,739 | adipic/<br>phthalic acids<br>1,2-propanediol<br>1,3-butanediol | — |
| P5 | Polyester | 5,249 | adipic acid<br>1,3-butanediol | — |
| P6 | Polyester | 5,391 | adipic acid<br>1,3-butanediol | — |
| P7 | Polyester | 11,703 | adipic acid<br>1,2-propanediol<br>1,4-butanediol | — |
| P8 | Dibenzoate | 314 | — | diethylene glycol dibenzoate (DEGDB) |

TABLE 1-continued

| Plasticizer Identifier | Plasticizer Type | $M_w$ (g/mol) | Raw Materials | Structure |
|---|---|---|---|---|
| P9 | Polyester | 14,000 (Mn = 10,000) | 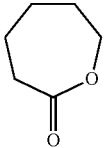 caprolactone | 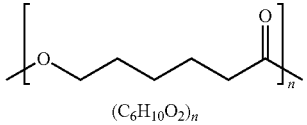 $(C_6H_{10}O_2)_n$ |
| P10 | Polyester | 2,000 (Mn) | 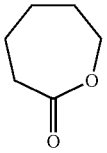 caprolactone | 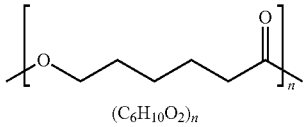 $(C_6H_{10}O_2)_n$ |

TABLE 2

| Copolyester Identifier | TPA (mol %) | EG (mol %) | CHDM (mol %) | DEG (mol %) | NPG (mol %) | TMCD (mol %) |
|---|---|---|---|---|---|---|
| M1 | 100 | 65 | 23 | 12 | 0 | 0 |
| M2 | 100 | 69 | 31 | 0 | 0 | 0 |
| M3 | 100 | 38 | 62 | 0 | 0 | 0 |
| M4 | 100 | 88 | 12 | 0 | 0 | 0 |
| M5 | 100 | 72 | 0 | 0 | 28 | 0 |
| M6 | 100 | 0 | 65 | 0 | 0 | 35 | n Table 2, TPA = terephthalic acid, EG = ethylene glycol, CHDM = 1,4-cyclohexandimethanol, DEG = diethylene glycol, NPG = neopentyl glycol, and TMCD = 2,2,4,4-tetramethyl-1,3-cyclobutanediol.

Examples 1-13

A 10 wt % plasticizer concentrate was prepared by injecting plasticizer P2 into a melt of copolyester M2 in a co-rotating twin-screw extruder using a liquid pumping system. The extrudate was then pelletized and used as a concentrate for mixing with copolyesters M1, M2, and M3 at several blending ratios to obtain the desired shrinkage characteristics.

A 2.5-inch OD screw extruder with an electrostatic pinning unit was used to cast a nominal 10-mil (254 microns) or less base film. The base film was then stretched in the transverse direction (TD) at stretch ratio of 5× and line speed of 50 fpm. All formulations contained 1 wt % of an antiblock agent, PETG C0235 available from Eastman Chemical Company. All of the stretched film samples had a nominal thickness of 50 microns, except for Examples 12 and 13, which had a nominal thickness of 40 and 25 microns, respectively. The formulations and tentering temperatures for each sample are displayed in Table 3.

TABLE 3

| Example No. | Copolyester | Amount of Plasticizer Concentrate (wt %) | Net Plasticizer Content (wt %) | Preheat/Stretching/ Annealing Temp. (° F.) |
|---|---|---|---|---|
| 1 | M1 | 0 | 0 | 175/175/165 |
| 2 | M1 | 10 | 1 | 175/175/165 |
| 3 | M1 | 20 | 2 | 175/175/165 |
| 4 | M2 | 0 | 0 | 175/175/165 |
| 5 | M2 | 10 | 1 | 180/180/165 |

TABLE 3-continued

| Example No. | Copolyester | Amount of Plasticizer Concentrate (wt %) | Net Plasticizer Content (wt %) | Preheat/Stretching/ Annealing Temp. (° F.) |
|---|---|---|---|---|
| 6 | M2 | 20 | 2 | 175/175/165 |
| 7 | M2 | 30 | 3 | 170/170/165 |
| 8 | M3 | 0 | 0 | 210/210/165 |
| 9 | M3 | 10 | 1 | 190/190/165 |
| 10 | M3 | 20 | 2 | 180/180/165 |
| 11 | M3 | 30 | 3 | 175/175/165 |
| 12 | M2 | 20 | 2 | 175/175/165 |
| 13 | M2 | 20 | 2 | 175/175/165 |

The tentering temperatures shown in Table 3 were adjusted based on the formulations to obtain a visually clear film (see Table 4 below). In general, for a certain polymer, a plasticizer may permit stretching a film at a lower temperature than would be possible without the plasticizer and to maintain low haze. Table 3 shows that copolyesters with a higher plasticizer content can be stretched at lower temperatures.

Examples 14 (Comparative)

A base film was made from copolyester M1 compounded with 10 wt % of plasticizer P8, a low molecular weight plasticizer, using the procedures of Examples 1-13.

Example 15

A base film was made from copolyester M2 compounded with 10 wt % of polymeric plasticizer P2, using the procedures of Examples 1-13.

Film samples from Examples 1-15 were visually inspected for clarity. Their inherent viscosities, glass transition temperatures (Tg), and thermal stability were measured and reported in Table 4 below.

TABLE 4

| Example No. | Visual Clarity | Inherent Viscosity (dL/g) | Tg (° C.) | Temp. at 10 wt % Loss in Air (° C.) | Temp. at 10 wt % Loss in Nitrogen (° C.) |
|---|---|---|---|---|---|
| 1 | clear | 0.712 | 69 | 403.2 | 412.3 |
| 2 | clear | 0.707 | 68 | 403.6 | 411.4 |
| 3 | clear | 0.689 | 63 | 404.6 | 408.4 |
| 4 | clear | 0.738 | 81 | 408.0 | 412.8 |
| 5 | clear | 0.728 | 75 | 405.1 | 415.8 |
| 6 | clear | 0.712 | 71 | 402.7 | 409.8 |
| 7 | clear | 0.698 | 66 | 399.8 | 411.5 |
| 8 | clear | 0.716 | 85 | 396.6 | 409.8 |
| 9 | clear | 0.702 | 77 | 396.9 | 409.2 |
| 10 | clear | 0.691 | 72 | 398.1 | 409.5 |
| 11 | clear | 0.675 | 67 | 397.4 | 407.8 |
| 12 | clear | 0.711 | 70 | 404.9 | 407.9 |
| 13 | clear | 0.707 | 71 | 401.0 | 407.3 |
| 14 | clear | 0.664 | 36 | 294.1 | 302.5 |
| 15 | clear | 0.661 | 43 | 396.2 | 401.9 |

Inherent Viscosity

Inherent viscosity (IhV) was measured at 25° C. using 0.5 grams of sample per 100 mL of a solvent consisting of 60% by weight of phenol and 40% by weight of tetrachloroethane.

The IhV degradation for all samples seemed to be reasonable as displayed in Table 4. The plasticizer concentrate had an initial low IhV of 0.661 dL/g (Example 15). The resulting IhV would be logically lower if a higher amount of plasticizer concentrate were added. All samples had an IhV of around 0.7 dL/g, which is acceptable for a shrink film.

Glass Transition Temperature

The primary function of a good plasticizer is to reduce the Tg of the polymer. All Tg's were measured in a DSC by heating the sample to 280° C. at 20° C./min, quenching to −20° C., and then heating to 280° C. again. The Tg was taken from the 2$^{nd}$ heating cycle in nitrogen atmosphere for three polymer series M1, M2 and M3 shown in Table 8.

By linear regression, the Tg reduction by adding plasticizer concentrate (PZ conc.) in three different polymers can be expressed by equations (1)-(3) below:

$$Tg=-0.3096 \times PZ \text{ conc. }\%+69.143 \text{ (Examples 1-3 for } M1 \text{ series)} \quad (1)$$

$$Tg=-0.481 \times PZ \text{ conc. }\%+80.369 \text{ (Examples 4-7 for } M2 \text{ series)} \quad (2)$$

$$Tg=-0.5723 \times PZ \text{ conc. }\%+83.461 \text{ (Examples 8-11 for } M3 \text{ series)} \quad (3)$$

It is desirable to know these correlations, as they allow a film to be made with a desired Tg. For example, to match the 70° C. Tg of copolyester M1 using a copolyester M2, the weight % of the plasticizer concentrate can be calculated using equation 2 and found to be 20. Similarly, it would take about 30 wt % of the plasticizer concentrate in copolyester M3 to achieve a similar Tg using equation 3 above. The plasticizer effectiveness increases with increasing CHDM content in the copolyester, as indicated by the magnitude of the negative slope in the equations above. Shrink films with a Tg ranging from 50° C. to 90° C. are preferable, especially when a steam shrink tunnel is employed.

Thermal Stability

Thermal degradation, in air and in nitrogen, was conducted to examine if there were any significant weight loss associated with various plasticizer loading levels in the different polymers. ASTM D3850-12 was used as the testing method. The heating rate was 20° C./min from 20° C. to 600° C. The results are shown in Table 4 above.

At 10% weight loss, there was little or no discernible temperature difference between the neat polymer and the same polymer with different plasticizer concentrations. These results indicate that there was no additional weight loss due to plasticizer instability at high temperatures. The temperature during typical compounding and extrusion processes would generally not exceed 300° C.

On the other hand, copolyester M1 with 10 wt % of the low molecular weight plasticizer P8 (DEGDB, Mw=314, Example 14) started to lose weight at 200° C. in air. It lost 10 wt % at 294° C. and 20 wt % at 400° C. These results indicate that DEGDB is an efficient plasticizer for copolyesters, but is not thermally stable.

Shrinkage Testing

The oriented films from Examples 1-11 were cut into 100 mm×100 mm square samples. The samples were tested in a water bath at various temperatures for 10 seconds. The percent shrinkage was then calculated using the following equation:

shrinkage %=100−final sample length (mm).

From this data, the shrinkage versus temperature curve (or shrink curve) in the transverse direction (TD) can be constructed. The shrink on-set temperature is defined as the temperature where the TD shrink curve and temperature axis intersect. An ideal shrink curve for "low" temperature packaging should have a shrink on-set temperature of around 55° C. For general shrink packaging, the shrink on-set temperature should be around 65° C. For hot-fill applications, the shrink on-set temperature should be above 75° C. to prevent the label from sticking due to residual heat, e.g., hot tea shrink labeling.

The shrinkage results are shown in Tables 5-7 below.

Table 8 shows some additional properties for the films from Examples 1-13.

TABLE 5

| Water Bath Temperature (° C.) | Example 1 TD Shrinkage (%) | Example 2 TD Shrinkage (%) | Example 3 TD Shrinkage (%) |
|---|---|---|---|
| 60 | not measured | not measured | 6 |
| 65 | 1 | 12 | 28 |
| 70 | 25 | 34 | 39 |
| 75 | 44 | 48 | 48 |
| 80 | 55 | 58 | 56 |
| 85 | 67 | 67 | 62 |
| 90 | 74 | 72 | 69 |
| 95 | 76 | 76 | 73 |

TABLE 6

| Water Bath Temperature (° C.) | Example 4 TD Shrinkage (%) | Example 5 TD Shrinkage (%) | Example 6 TD Shrinkage (%) | Example 7 TD Shrinkage (%) |
|---|---|---|---|---|
| 65 | 2 | 1 | 3 | 4 |
| 70 | 3 | 7 | 13 | 20 |
| 75 | 15 | 31 | 42 | 46 |
| 80 | 41 | 52 | 60 | 60 |
| 85 | 61 | 68 | 69 | 67 |
| 90 | 72 | 75 | 74 | 71 |
| 95 | 78 | 78 | 76 | 75 |

TABLE 7

| Water Bath Temperature (° C.) | Example 8 TD Shrinkage (%) | Example 9 TD Shrinkage (%) | Example 10 TD Shrinkage (%) | Example 11 TD Shrinkage (%) |
|---|---|---|---|---|
| 65 | 1 | 1 | 1 | 5 |
| 70 | 1 | 2 | 5 | 18 |
| 75 | 2 | 10 | 27 | 42 |
| 80 | 10 | 33 | 50 | 51 |
| 85 | 27 | 48 | 58 | 57 |
| 90 | 34 | 53 | 62 | 60 |
| 95 | 42 | 58 | 66 | 63 |

TABLE 8

| Example Number | Copolyester/ Plasticizer Combination | Shrink On-Set Temp. (° C.) | Shrink Stress Force at 400° F. (MPa) | Machine Direction Elongation at Break (%) | Average Modulus (MPa) | Total Surface Energy (dyne/cm) |
|---|---|---|---|---|---|---|
| 1 | M1 | 65 | 6.3 | 3.9 | 2922 | 47.2 |
| 2 | M1 + 1% P2 | 63 | 4.6 | 3.6 | 2828 | 48.1 |
| 3 | M1 + 2% P2 | 55 | 3.6 | 3.2 | 2584 | 48.1 |
| 4 | M2 | 70 | 15.4 | 364 | 3835 | 47.4 |
| 5 | M2 + 1% P2 | 69 | 13.1 | 309 | 3812 | 47.9 |
| 6 | M2 + 2% P2 | 68 | 9.1 | 351 | 3544 | 48.7 |
| 7 | M2 + 3% P2 | 67 | 7.4 | 343 | 3541 | 49.0 |
| 8 | M3 | 75 | 11.2 | 80 | 3108 | 48.2 |
| 9 | M3 + 1% P2 | 72 | 11.1 | 79 | 3474 | 47.3 |
| 10 | M3 + 2% P2 | 66 | 10.5 | 63 | 3364 | 42.9 |
| 11 | M3 + 3% P2 | 62 | 6.9 | 60 | 3180 | 48.4 |
| 12 | M2 + 2% P2 (40 micron film) | 65 | 10.3 | 345 | 3674 | 49.6 |
| 13 | M2 + 2% P2 (25 micron film) | 64 | 11.0 | 288 | 4434 | 49.2 |

Examples 1-12 have a nominal film thickness of 50 microns.

With a Tg of 70° C. and a shrink on-set temperature of 65° C., polymer M1 is very useful in shrink film applications. For even lower temperature shrink packaging, polymer M1 can be plasticized with the plasticizers of the invention, resulting in lower on-set temperature shrink curves, as shown in Table 5.

As seen from Table 5, the shrinkage at 70° C. increased with increasing plasticizer content for the M1 polymer. These films were all stretched under the same tentering conditions (see Table 3). As seen from Table 4, the shrinkage increase correlates with the Tg reduction of the polymer by the plasticizer.

As seen from Table 8, the shrink on-set temperature decreased with increasing plasticizer content. With 20 wt % of the plasticizer concentrate or just 2 wt % net plasticizer content in the shrink film, the shrink on-set temperature of Example 3 dropped to 55° C. from 65° C. of neat polymer (Example 1). This lower shrink on-set temperature would allow shrink sleeves to finish quicker in a shrink tunnel. This is desirable for packaging heat sensitive goods such as milk, etc. One caution, however, is that this shrink film must be safeguarded from overheating during storage and transportation, especially in the summer time of hot climate areas.

With a higher Tg of 80° C., neat polymer M2 is not ideal for shrink film applications, in part, because it has a high shrink on-set temperature, which results in partially finished shrink labels in high-speed production lines. The shrink film reacts to heat too slowly and does not have enough dwell time to finish shrinkage. Making the tunnel longer or to run the line slower is not desired in today's output oriented production.

But by adding the plasticizer concentrate into polymer M2, different shrink properties can be obtained as illustrated by the shrink curve data in Table 6. The shrink characteristics of polymer M1 (Table 5, Example 1) can be closely approximated by using 30 wt % of the plasticizer concentrate (3 wt % net plasticizer content) in the polymer M2 (Table 6, Example 7).

As seen in Table 8, the shrink on-set temperatures of Examples 1 and 7 were almost the same. There is an advantage of plasticized polymer M2 versus polymer M1. A plasticized polymer M2 film is much stronger than a film from polymer M1, thereby enabling high-speed operation in tentering, slittering, printing, sleeving, and dispensing with much less film breakage. Film breakage during any conversion step is detrimental to production efficiency.

Similarly, neat polymer M3 is unsuitable for certain shrink film applications because of its even higher Tg of 85° C. Stretched film from polymer M3 has a high shrink on-set shrink temperature of 75° C. and a low ultimate shrinkage (see Table 7, Example 8). Such a film would not perform well in a steam tunnel for labeling high contour bottles. However, it would perform rather well in a hot air tunnel for low shrink applications such as batteries or wine caps. It can also be used safely in hot-fill shrink labeling to prevent label sticking due to residual heat in the container's contents, such as from hot tea or coffee, resulting in softening of the label that can occur with polymers of lower Tg.

Polymer M3 can be plasticized with a plasticizer, and the resulting shrink curves are shown in Table 7. Even though the shrinkage increased with increasing plasticizer content, the plasticized polymer M3 still did not have enough ultimate shrinkage for full body labeling. However, it can be used for bottles with less contour and high temperature shrink labeling, such as required for hot-fill applications.

Shrink Force

As seen in Table 8, the addition of plasticizer reduced the shrink force of the film. The shrink stress was calculated by dividing the peak force at 400° F. over the cross-sectional area of the sample. In polymer M2 examples, the shrink force was high in the absence of plasticizer and was reduced significantly with the addition of plasticizer, as shown in Table 8. In polymer M3 examples, the plasticizer can also bring down the shrink force at high loading, such as 30 wt % of the concentrate or above.

Film Breakage

Web or film breaking is an issue in every step of shrink film production, conversion, and application. Improper drying in film extrusion usually contributes to the majority of the problem. Film aging (free volume relaxation) can also exacerbate the web-breaking problem. Solvent attack and excessive web tension can cause problems in the printing process.

Ideally, a shrink film should be strong enough to accommodate all potential tensions without a web break. One way to measure the ductility of the TD stretched film is by testing the machine direction (MD) tensile elongation at break at 350 mm/min according to ASTM 882. The results for the shrink films from Examples 1-13 are shown in Table 8.

As seen in Table 8, the elongation at break in the MD was relatively low for polymer M1 and was not significantly influenced by the amount of plasticizer additive. Part of the effect may have come from the lower IhV obtained at higher plasticizer concentrate loadings.

Compared to a high DEG polymer like M1, polymer M2 has much better MD elongation at break, as shown in Table 8. While adding plasticizer may have lowered the elongation slightly, partially from the IhV reduction, the elongation remained approximately ninety times greater than the elongation of polymer M1. The effect of the plasticizer on polymer M3 was similar, as indicated in Table 8. Polymer M3 has a 10-20 times better result than polymer M1 in MD elongation at break.

Modulus (Flexural Rigidity)

Table 8 shows the average modulus of MD and TD moduli, which is proportional to flexural rigidity of the film.

High rigidity prevents sleeve labels from collapsing in high-speed applications. In principle, an effective plasticizer should make a rigid film more flexible, similar to plasticized PVC film. The polymeric plasticizer according to the invention, however, did not alter the modulus of copolyester significantly, as shown in Table 8.

Surface Energy

Printability is a highly desirable property for shrink film packaging. Though the surface energy is not the only indicator for printability, it will indicate if the plasticizer migrates to the surface and reduces the total surface energy.

As seen in Table 8, there is no evidence that the plasticizers according to the invention changed the surface energy of the stretched films. Since the plasticizer is polymeric, its migration to the film surface would be very slow, if at all.

From the thermal stability data (Table 4), the affinity between the polymer matrix and the plasticizer seemed to be very strong, as indicated by little if any discernible weight loss at higher temperatures.

Down-Gauging

As previously noted, adding DEG to a copolyester can lower its Tg and improve the shrinkage properties of films made from the copolyester. The resulting composition, however, tend to be more brittle due to the higher DEG content. Thus, films made from polymer M1 are more prone to web-break when stretching in a tenter, printing in a press, and/or dispensing in a sleeve applicator. This is especially true for thinner films, e.g., below 40 micron in thickness. To enable down-gauging without losing productivity, polymer M2 with the addition of plasticizer seems to be a promising alternative, as shown in Table 9 below where a 25-micron polymer M2 film was successfully produced with good shrinkage. Also, as seen in Table 9, the shrinkage and the shrink on-set temperature of the down-gauged film (25 microns) with the plasticizer mimic those of higher gauge films (40 and 50 microns).

TABLE 9

| Water Bath Temperature (° C.) | Example 6 TD Shrinkage of 50 Micron Film (%) | Example 12 TD Shrinkage of 40 Micron Film (%) | Example 13 TD Shrinkage of 25 Micron Film (%) |
| --- | --- | --- | --- |
| 65 | 3 | 4 | 8 |
| 70 | 13 | 23 | 37 |
| 75 | 42 | 49 | 51 |
| 80 | 60 | 61 | 65 |
| 85 | 69 | 70 | 72 |
| 90 | 74 | 73 | 76 |
| 95 | 76 | 77 | 78 |

Copolyester Composition

A shrink film is typically amorphous even though it is highly orientated. Crystallization induced by orientation will reduce the ultimate shrinkage of the film. A film with less than 30% ultimate shrinkage at 95° C. has less utility in shrink applications. Copolyester M4 was used to demonstrate the concept of crystallization half-time.

The M4 polymer has an IhV of 0.68 dlg and a minimum half-time crystallization ($t_{1/2}$ min) of 517 seconds (8.6 minutes). Crystallization half-times were measured using a Perkin-Elmer Model DSC-2 differential scanning calorimeter. 10.0 mg of each sample were sealed in an aluminum pan and heated at a rate of 320° C./min to 290° C. and held for 2 minutes in a helium atmosphere. The sample was then cooled immediately at a rate of 320° C./min to an isothermal crystallization temperature ranging from 140° C. to 200° C. with a 10° C. interval. The crystallization half-time at each temperature was then determined as the time needed to reach the peak on the exothermic curve. The minimum crystallization half-time is the temperature where the crystallization rate is the fastest.

Examples 16-21

Shrink films were made by blending the polymer M4 with 0-50 wt % of a plasticizer concentrate, which contained 10 wt % of plasticizer P2 in polymer M2, following the procedures of Examples 1-13, except that the films were stretched 4× at 85° C.

As seen in Table 10, at a lower percentage of the plasticizer concentrate (0-30 wt %), the film crystallized after being stretched. The ultimate shrinkage at 95° C. of these films was in the lower 30% range, which is the practical lower limit for shrink film applications.

The CHDM content increased with increasing plasticizer concentration due to the high CHDM-containing plasticizer concentrate. As seen in Table 10, the oriented film was more amorphous and less crystalline when the resulting CHDM content in the film was 18 mol % or higher. The Tg continued to decrease with increasing plasticizer content. Thus, the shrinkage at 75° C. increased with increasing plasticizer content, although the ultimate shrinkage at 95° C. of all the samples remained more or less in the lower 30% range. Based on the shrinkage requirements for a shrink film, any polyester can be used in this invention provided that its minimum crystallization half time is at least 8.6 minutes.

TABLE 10

| Example Number | Net Plasticizer Content (wt %) | Tg (° C.) | CHDM Content (mol %) | Crystallinity (%) | Shrinkage at 75° C. (%) | Shrinkage at 95° C. (%) |
| --- | --- | --- | --- | --- | --- | --- |
| 16 | 0 | 78 | 12 | 24 | 2 | 34 |
| 17 | 1 | 74 | 14 | 23 | 8 | 30 |
| 18 | 2 | 70 | 16 | 18 | 10 | 30 |
| 19 | 3 | 67 | 18 | 4 | 20 | 32 |
| 20 | 4 | 63 | 20 | 7 | 24 | 32 |
| 21 | 5 | 60 | 22 | 3 | 26 | 34 |

Examples 22-25

A polymer containing 28 mole % NPG and 72 mole % EG (polymer M5) was also blended with the plasticizer concentrate, formed into shrink film, and tested. Table 11 shows that adding a polymeric plasticizer according to the invention reduced the Tg of the polymer M5. Table 12 reports the TD shrinkage of the films made from the polymer M5 stretched 5× at 85° C. using a Bruckner film stretcher. The data in Table 12 shows that the polymeric plasticizer according to the invention also works well with NPG-containing polymers.

TABLE 11

| Example No. | Polymer M5 Content (wt %) | Plasticizer Concentrate Content (wt %) | Net Plasticizer Content (wt %) | Tg (° C.) |
|---|---|---|---|---|
| 22 | 100 | 0 | 0 | 78 |
| 23 | 90 | 10 | 1 | 74 |
| 24 | 80 | 20 | 2 | 70 |
| 25 | 70 | 30 | 3 | 68 |

TABLE 12

| Water Bath Temperature (° C.) | Example 22 TD Shrinkage (%) | Example 23 TD Shrinkage (%) | Example 24 TD Shrinkage (%) | Example 25 TD Shrinkage (%) |
|---|---|---|---|---|
| 65 | 0 | 0 | 18 | 28 |
| 70 | 4 | 18 | 48 | 44 |
| 75 | 30 | 40 | 54 | 54 |
| 80 | 50 | 54 | 60 | 54 |
| 85 | 68 | 66 | 64 | 61 |
| 90 | 72 | 70 | 70 | 70 |
| 95 | 76 | 74 | 70 | 70 |

Examples 26-36

Films (approximately 254 microns thick) were prepared from blends containing the polymers and plasticizers listed in Table 13. Their visual clarity and Tg were determined and are reported in Table 13.

Polycaprolactone (PCL) is a polyester having a Tg of about −60° C. PCL can be used as a polymeric plasticizer for PVC.

Example 26 is a base film made of copolyester M2 with 10 wt % of plasticizer P9 (PCL, $M_n$=10,000). The resulting film was very hazy.

Example 27 is a base film made of copolyester M2 with 10 wt % of plasticizer P10 (PCL, $M_n$=2,000). The resulting film was also hazy.

Based on the haziness of the resulting films, PCL is not compatible with copolyester M2.

Examples 28-30 are base films made of copolyester M6 (Tg=120° C.) with plasticizer P2 ($M_w$=2,848). As seen in Table 13, the combination is compatible based on the clarity of the films. The Tg's of Examples 29-30 are below 90° C., which indicates that shrink films made from these blends would be particularly useful in a steam shrink tunnel.

As seen from Example 15 in Table 4 and Examples 31-36 in Table 13, the polyester plasticizers having a Mw from 1,000 to 12,000 according to the invention are compatible with polymer M2. The film in Example 36 was slightly hazy and showed the least Tg reduction, which indicate a relationship between the compatibility and the molecular weight of these polyester plasticizers with polymer M2.

TABLE 13

| Example No. | Copolyester | Plasticizer | Plasticizer Amount (wt %) | Clarity | Tg (° C.) |
|---|---|---|---|---|---|
| 26 | M2 | P9 | 10 | Hazy | 78 |
| 27 | M2 | P10 | 10 | Hazy | 64 |
| 28 | M6 | P2 | 1 | Clear | 106 |
| 29 | M6 | P2 | 5 | Clear | 85 |
| 30 | M6 | P2 | 10 | Clear | 75 |
| 31 | M2 | P1 | 10 | Clear | 54 |
| 15 | M2 | P2 | 10 | Clear | 43 |
| 32 | M2 | P3 | 10 | Clear | 54 |
| 33 | M2 | P4 | 10 | Clear | 64 |
| 34 | M2 | P5 | 10 | Clear | 64 |
| 35 | M2 | P6 | 10 | Clear | 53 |
| 36 | M2 | P7 | 10 | Slightly Hazy | 68 |

To summarize, Table 14 illustrates the pass (O), fair (Δ), or fail (X) scores for all of these examples. The four selection criteria are the crystallization, thermal stability, compatibility, and glass transition temperature as described above. Note that samples are less useful as shrink film materials if they do not pass all criteria. Examples 14 and 15 have their Tg's below 50° C. at 10 wt % plasticizer. However, reducing the plasticizer content in these blends can increase their Tg. Thus, Examples 14 and 15 were not marked with "X" in the Tg column, even though Example 14 failed the thermal stability test. Crystallization half-time is a selection criterion for the copolyester. Thermal stability and compatibility are selection criteria for the plasticizer. Compatibility and glass transition are selection criteria for the polymer/plasticizer blends.

TABLE 14

| Example Nos. | $t_{1/2}$ > 8.6 min | Thermal Stability | Compatibility/ Clarity | Tg = 50 to 90° C. |
|---|---|---|---|---|
| 1-13 | O | O | O | O |
| 14 | O | X | O | O |
| 16-18 | O | O | O | O |
| 19-21 | O | O | O | O |
| 22-25 | O | O | O | O |
| 26-27 | O | not tested | X | O |
| 28 | O | not tested | O | X |
| 29-30 | O | O | O | O |
| 15 and 31-35 | O | O | O | O |
| 36 | O | O | Δ | O |

Unless otherwise specified, the following ASTM methods were used. D2857-96 for inherent viscosity, D3418 for glass transition temperature, D3850 for thermal stability, D2732 for shrinkage, D882 for elongation at break and modulus, and D5946 for surface energy.

The invention has been described in detail with particular reference to preferred embodiments thereof, but it will be understood that variations and modifications can be effected within the spirit and scope of the invention.

We claim:
1. A stretched film comprising:
(a) a copolyester having a minimum crystallization half-time ($t_{1/2}$min) of at least 8.6 minutes,
wherein the copolyester comprises:
(i) a diacid component comprising at least 50 mole percent of residues of terephthalic acid, naphthalenedicarboxylic acid, 1,4-cyclohexanedicarboxylic acid, isophthalic acid, or mixtures thereof; and
(ii) a diol component comprising at least 80 mole percent of residues of a diol containing 2 to 10 carbon atoms,
wherein the diacid component is based on 100 mole percent of total diacid residues in the copolyester and the diol component is based on 100 mole percent of total diol residues in the copolyester; and

(b) a polyester plasticizer having a weight-average molecular weight (Mw) of 900 to 12,000 g/mol,
wherein the polyester plasticizer comprises:
(i) a diol component comprising residues of a diol having 2 to 8 carbon atoms; and
(ii) a diacid component comprising residues of a dicarboxylic acid having 4 to 12 carbon atoms;
wherein the film comprises 90 to 99.9 weight percent of the copolyester and 0.1 to 10 weight percent of the polyester plasticizer;
wherein the film has a glass transition temperature of from 40 to 150° C. and the film is stretched at temperatures 5° C. to 80° C. above its glass transition temperature (Tg);
wherein the stretched film has a thickness of 25 to 75 micrometers;
wherein the film is stretched from 2 to 6 times its original measurements; and
wherein the film is clear.

2. The stretched film of claim 1, wherein the film has a glass transition temperature of from 50 to 90° C.

3. The stretched film of claim 1, wherein the copolyesters has an inherent viscosity of 0.5 to 1.2 dL/g.

4. The stretched film of claim 1, wherein the copolyesters has an inherent viscosity of 0.6 to 0.9 dL/g.

5. The stretched film of claim 1, wherein the film is stretched in either the machine direction, the transverse direction, or both.

6. The stretched film of claim 1, wherein the film is stretched in the machine direction.

7. The stretched film of claim 1, wherein the film is stretched at temperatures 5° C. to 20° C. above its $T_g$.

8. The stretched film of claim 1, wherein the film is stretched at temperatures 10° C. to 20° C. above its $T_g$.

9. The stretched film of claim 1, wherein the film is stretched at a rate from 5 to 20 inches (12.7 to 50.8 cm) per second.

10. The stretched film of claim 1, wherein the film has a thickness below 40 micrometers.

11. The stretched film of claim 1, wherein the polyester plasticizer has a $M_w$ of 1,000 to 5,000 g/mol.

12. The stretched film according to claim 1, wherein the diacid component of the copolyester comprises at least 80 mole percent of residues of terephthalic acid, naphthalenedicarboxylic acid, 1,4-cyclohexanedicarboxylic acid, isophthalic acid, or mixtures thereof.

13. The stretched film according to claim 1, wherein the diol component of the copolyester comprises residues of ethylene glycol, 1,4-cyclohexanedimethanol, diethylene glycol, neopentyl glycol, 2,2,4,4-tetramethyl-1,3-cyclobutanediol, or mixtures thereof.

14. The stretched film according to claim 1, wherein the copolyester comprises:
(i) a diacid component comprising at least 80 mole percent of terephthalic acid residues; and
(ii) a diol component comprising at least 80 mole percent of residues of ethylene glycol and 1,4-cyclohexanedimethanol.

15. The stretched film according to claim 1, wherein the copolyester comprises:
(i) a diacid component comprising at least 80 mole percent of terephthalic acid residues; and
(ii) a diol component comprising at least 80 mole percent of residues of ethylene glycol, 1,4-cyclohexanedimethanol, and diethylene glycol.

16. The stretched film according to claim 1, wherein the copolyester comprises:
(i) a diacid component comprising at least 80 mole percent of terephthalic acid residues; and
(ii) a diol component comprising at least 80 mole percent of residues of ethylene glycol and neopentyl glycol.

17. The stretched film according to claim 1, wherein the copolyester comprises:
(i) a diacid component comprising at least 80 mole percent of terephthalic acid residues; and
(ii) a diol component comprising at least 80 mole percent of residues of 1,4-cyclohexanedimethanol and 2,2,4,4-tetramethyl-1,3-cycobutanediol.

18. The stretched film according to claim 1, wherein the diol component of the polyester plasticizer comprises residues of ethylene glycol, 1,2-propanediol, 1,3-propanediol, 1,2-butanediol, 1,3-butanediol, 1,4-butanediol, diethylene glycol, dipropylene glycol, or mixtures thereof.

19. The stretched film according to claim 1, wherein the diacid component of the polyester plasticizer comprises residues of succinic acid, glutaric aid, adipic acid, azelaic acid, sebacic acid, isophthalic acid, orthophthalic acid, terephthalic acid, or mixtures thereof.

20. The stretched film according to claim 1, wherein the polyester plasticizer comprises residues of phthalic acid, adipic acid, or mixtures thereof; and residues of 1,2-propanediol, 1,3-butanediol, 1,4-butanediol, or mixtures thereof.

* * * * *